United States Patent
Lambrecht (10) Patent No.: US 8,213,872 B2
(45) Date of Patent: Jul. 3, 2012

(54) TECHNIQUE FOR LOW-POWER OPERATION OF A WIRELESS DEVICE

(75) Inventor: Frank Lambrecht, Mountain View, CA (US)

(73) Assignee: Rambus Inc., Sunnyvale, CA (US)

( * ) Notice: Subject to any disclaimer, the term of this patent is extended or adjusted under 35 U.S.C. 154(b) by 726 days.

(21) Appl. No.: 12/333,134

(22) Filed: Dec. 11, 2008
(Under 37 CFR 1.47)

(65) Prior Publication Data
US 2009/0186584 A1 Jul. 23, 2009

Related U.S. Application Data

(60) Provisional application No. 61/014,883, filed on Dec. 19, 2007.

(51) Int. Cl.
*H04B 17/00* (2006.01)
(52) U.S. Cl. ............... 455/67.11; 455/522; 455/226.13
(58) Field of Classification Search .................. 455/522, 455/226.1, 232.1, 75, 67.11
See application file for complete search history.

(56) References Cited

U.S. PATENT DOCUMENTS

| | | | |
|---|---|---|---|
| 2005/0032540 A1* | 2/2005 | Lee et al. | 455/522 |
| 2006/0079191 A1* | 4/2006 | Parssinen et al. | 455/226.1 |
| 2007/0077894 A1* | 4/2007 | Zhang et al. | 455/75 |
| 2007/0088995 A1 | 4/2007 | Tsern | |
| 2007/0135071 A1* | 6/2007 | Lee et al. | 455/232.1 |
| 2008/0080261 A1 | 4/2008 | Shaeffer | |
| 2008/0144411 A1 | 6/2008 | Tsern | |

FOREIGN PATENT DOCUMENTS
WO 2008076790 A2 6/2008

* cited by examiner

*Primary Examiner* — Jean B Jeanglaude
(74) *Attorney, Agent, or Firm* — Park, Vaughan, Fleming & Dowler LLP (57) ABSTRACT

Embodiments of a circuit are described. In this circuit, a receiver includes at least one input node that receives one or more signals from one or more antenna elements. Note that a given signal from a given antenna element may have an associated fixed bandwidth and/or may include directional information corresponding to a region in a space. Moreover, the receiver includes a measurement circuit, coupled to at least the one input node, that determines whether a metric of the given signal exceeds a corresponding threshold. Additionally, control logic in the circuit, which is coupled to the measurement circuit, instructs a communication circuit in the circuit to exit a first power-consumption mode if the metric of at least one of the signals exceeds the corresponding threshold.

25 Claims, 9 Drawing Sheets

```
                                                                    ┌─ 600
┌─────────────────────────────────────────────────────────────────┐
│  RECEIVE ONE OR MORE SIGNALS FROM ONE OR MORE ANTENNA ELEMENTS, │
│     WHERE A GIVEN SIGNAL FROM A GIVEN ANTENNA ELEMENT HAS AN    │
│  ASSOCIATED FIXED BANDWIDTH AND INCLUDES DIRECTIONAL INFORMATION│
│             CORRESPONDING TO A REGION IN A SPACE                │
│                              610                                │
└─────────────────────────────────────────────────────────────────┘
                                   │
                                   ▼
┌─────────────────────────────────────────────────────────────────┐
│    DETERMINE WHETHER A METRIC OF THE GIVEN SIGNAL EXCEEDS A     │
│                    CORRESPONDING THRESHOLD                      │
│                              612                                │
└─────────────────────────────────────────────────────────────────┘
                                   │
                                   ▼
┌─────────────────────────────────────────────────────────────────┐
│  INSTRUCT AT LEAST A COMMUNICATION CIRCUIT IN A DEVICE TO EXIT A│
│  FIRST POWER-CONSUMPTION MODE IF THE METRIC OF AT LEAST ONE OF  │
│        THE ONE OR MORE SIGNALS EXCEEDS THE THRESHOLD            │
│                              614                                │
└─────────────────────────────────────────────────────────────────┘
```

TECHNIQUE FOR LOW-POWER OPERATION OF A WIRELESS DEVICE

This application hereby claims priority under 35 U.S.C. §119 to U.S. Provisional Patent application Ser. No. 61/014,883, filed on 19 Dec. 2007, entitled "TECHNIQUE FOR LOW-POWER OPERATION OF A WIRELESS DEVICE", by inventor(s) Frank Lambrecht (R-RA0597.Provl.US). The present application hereby incorporates by reference the above-referenced provisional patent application.

FIELD

The present embodiments relate to techniques for power management in communication systems. More specifically, the present embodiments relate to circuits and techniques for detecting a wake-up signal and exiting a reduced power-consumption mode in devices in communication systems.

BRIEF DESCRIPTION OF THE FIGURES

Note that like reference numerals refer to corresponding parts throughout the drawings.

DETAILED DESCRIPTION

The following description is presented to enable any person skilled in the art to make and use the disclosed embodiments, and is provided in the context of a particular application. Various modifications to the disclosed embodiments will be readily apparent to those skilled in the art, and the general principles defined herein may be applied to other embodiments and applications without departing from the spirit and scope of the present description. Thus, the present description is not intended to be limited to the embodiments shown, but is to be accorded the widest scope consistent with the principles and features discussed herein.

Embodiments of a power-consumption-mode circuit, a device that includes the operating-mode circuit, a communication system which includes one or more of the devices, and techniques for selecting a mode of a device in a communication system are described. These circuits and techniques may be used to switch a wireless device from a first power-consumption mode to a second power-consumption mode, where the second power-consumption mode consumes more power than the first power-consumption mode. For example, the first power-consumption mode may be a reduced power-consumption mode and the second power-consumption mode may be an active mode, i.e., a higher power-consumption mode. Moreover, there may be additional power-consumption modes than the first power-consumption mode and the second power-consumption mode.

In some embodiments, power measurements on directional and/or frequency-selective signals, which are received using one or more antenna elements, may be used to determine whether or not to switch the power-consumption mode. Moreover, when the wireless device switches to the second power-consumption mode, these measurements may provide directional information associated with a communication path that can be used to communicate with another device. Additionally, in some embodiments the power measurements are non-coherent and/or are asynchronous (or non-synchronous), i.e., the power measurements can be performed prior to synchronization with the other device.

In some embodiments, the power-consumption-mode circuit (which may also be referred to as a power-management circuit) includes a receiver, which includes at least one input node that receives one or more signals from one or more antenna elements. Note that in some embodiments a given signal from a given antenna element has an associated fixed bandwidth and/or includes directional information corresponding to a region in a space. Moreover, the receiver may include a measurement circuit, coupled to at least the one input node, that determines whether a metric of the given signal exceeds a corresponding threshold. Additionally, control logic in the receiver, which is coupled to the measurement circuit, may instruct a communication circuit (for example, in a device that includes the power-consumption-mode circuit) to exit the first power-consumption mode if the metric of at least one of the one or more signals exceed the corresponding threshold.

In some embodiments, the one or more antenna elements may be part of an antenna or antennas, and one or more of the antennas may be a phase-arrayed antenna.

In some embodiments, two or more signals from different antenna elements are associated with different bands of frequencies and/or are selectively coupled to the measurement circuit using time multiplexing, thereby facilitating determination of a direction associated with the at least one signal. Moreover, the region in the space may be selected using passive or active beam steering, which may also facilitate determining the direction associated with the at least one signal. Note that the direction may be used to communicate information with another circuit when the communication circuit exits the first power-consumption mode.

In some embodiments, the control logic determines whether to instruct the communication circuit to exit the first power-consumption mode based on whether the metrics of two or more signals exceed their corresponding thresholds. Note that each of the signals may correspond, at least in part, to a different region of the space.

In some embodiments, whether the metric of the given signal exceeds the corresponding threshold is determined without using a synchronous detection technique.

In some embodiments, the control logic determines whether to instruct the communication circuit to exit the first power-consumption mode based on: the number of times the metric of at least the one signal exceeds the threshold during a time interval; a power-usage history of at least the communication circuit (which may be in the device); and/or an elapsed time since a previous exit from the first power-consumption mode.

In some embodiments, one or more thresholds are defined based on a power-usage criterion. Note that the power-usage criterion may be user selectable.

In some embodiments, the device includes multiple communication circuits and uses full-duplex communication, where a given communication circuit remains in the first power-consumption mode until the metric of at least the one signal exceeds the threshold even if another communication circuit has already exited the first power-consumption mode. Moreover, the signals for the given communication circuit may be orthogonal in space, time, frequency, and/or coding with the signals for the other communication circuit.

In some embodiments, an output from the measurement circuit is reset after a time interval and/or based on a power-usage history of at least the communication circuit in the device.

Another embodiment provides a system that includes the device and another device. The device includes the power-consumption-mode circuit and communicates information with the other device after the communication circuit exits the first power-consumption mode.

Another embodiment provides an integrated circuit in which the power-consumption-mode circuit is disposed on a semiconductor chip.

Another embodiment provides a computer-readable medium that includes data that specifies the power-consumption-mode circuit, the device that includes the power-consumption-mode circuit, and/or the system.

Another embodiment provides a method for selecting a mode, which may be performed by the device. During operation, the device receives one or more signals from one or more antenna elements, wherein a given signal from a given antenna element has an associated fixed bandwidth and includes directional information corresponding to a region in a space. Next, the device determines whether a metric of the given signal exceeds a corresponding threshold. Then, the device instructs at least a communication circuit in the device to exit a first power-consumption mode if the metric of at least one of the one or more signals exceeds the corresponding threshold.

The aforementioned embodiments may be used in a wide variety of applications, including: serial or parallel wireless links, wireless metropolitan area networks (such as WiMAX), wireless local area networks (WLANs), wireless personal area networks (WPANs), and systems and devices that include one or more antennas or antenna elements. For example, the embodiments may be used in conjunction with ultra-wide-band (UWB) communication and/or a communication standard associated with the Multi-Band OFDM Alliance (MBOA). Additionally, the aforementioned embodiments may be used in: desktop or laptop computers, hand-held or portable devices (such as personal digital assistants and/or cellular telephones), set-top boxes, printers, displays, a memory device (such as an optical, semiconductor, and/or a magnetic storage device), home networks, and/or video-game devices.

We now describe embodiments of circuits, wireless communication devices and systems that include these circuits or devices, and a power-management technique for use in the devices and systems. Due to atmospheric losses, operation of many wireless communication devices at high carrier frequencies consumes significant power. For example, devices that communicate in a band of frequencies near 60 GHz are estimated to consume between 0.1 and 1 W. Given the limitations of existing energy sources, such as batteries, this power consumption may be prohibitive, especially for portable devices.

Moreover, for a given transmit power, signals at these high carrier frequencies (such as between 50 and 90 GHz) have reduced range. However, this reduced range also reduces the ambient or background power level, because the signals do not propagate as far. In the discussion that follows, this reduction is used to facilitate the use of one or more wake-up signals. In particular, one or more power-consumption-mode circuits or sensors in a device can detect the presence of a wireless wake-up signal from a proximate device, for example, based on a metric of the wake-up signal (such as, for example, a power level, an amplitude, etc.). When the wake-up signal is detected, control logic in the device can instruct one or more communication circuits (which may be in a physical layer in the device) to exit a first power-consumption mode (henceforth referred to as a standby mode) and to communicate information with the proximate device. For example, the control logic may change a stored register state, thereby changing the mode of the device.

Moreover, because the ambient power level is reduced at the high carrier frequencies, the metric of the wake-up signal may be determined or measured without first synchronizing communication with a source that provides the wake-up signal (such as the proximate device). Consequently, measurement or determination of the metric of the wake-up signal may be non-coherent and/or non-synchronous. This can significantly reduce the complexity of the one or more power-consumption-mode circuits or sensors, for example, by eliminating heterodyne components (such as demodulators or mixers) and/or timing-recovery circuits (such as phase-locked loops).

Additionally, while detecting the presence of the wake-up signal, the device may also determine a direction associated with a communication path between the device and the proximate device. For example, the one or more power-consumption-mode circuits or sensors may be coupled to one or more antenna elements, each of which receives signals associated with a region in a space around the device. By selectively polling these antenna elements (for example, using time and/or frequency multiplexing) and determining whether the wake-up signal is present, the direction associated with the wake-up signal (and thus, the direction associated with the communication path) can be determined. Note that in some embodiments the one or more antenna elements are included in a phased-array antenna. Active or passive beam steering may be used to detect the presence of the wake-up signal in a particular direction.

Consequently, some embodiments of the power-consumption-mode circuit, as well as the technique for selecting a mode, may facilitate: reduced power consumption, simpler devices, reduced device cost, and/or simpler operation of these devices (for example, by significantly reducing the time needed to determine the direction associated with the communication path).

Figure 1A:
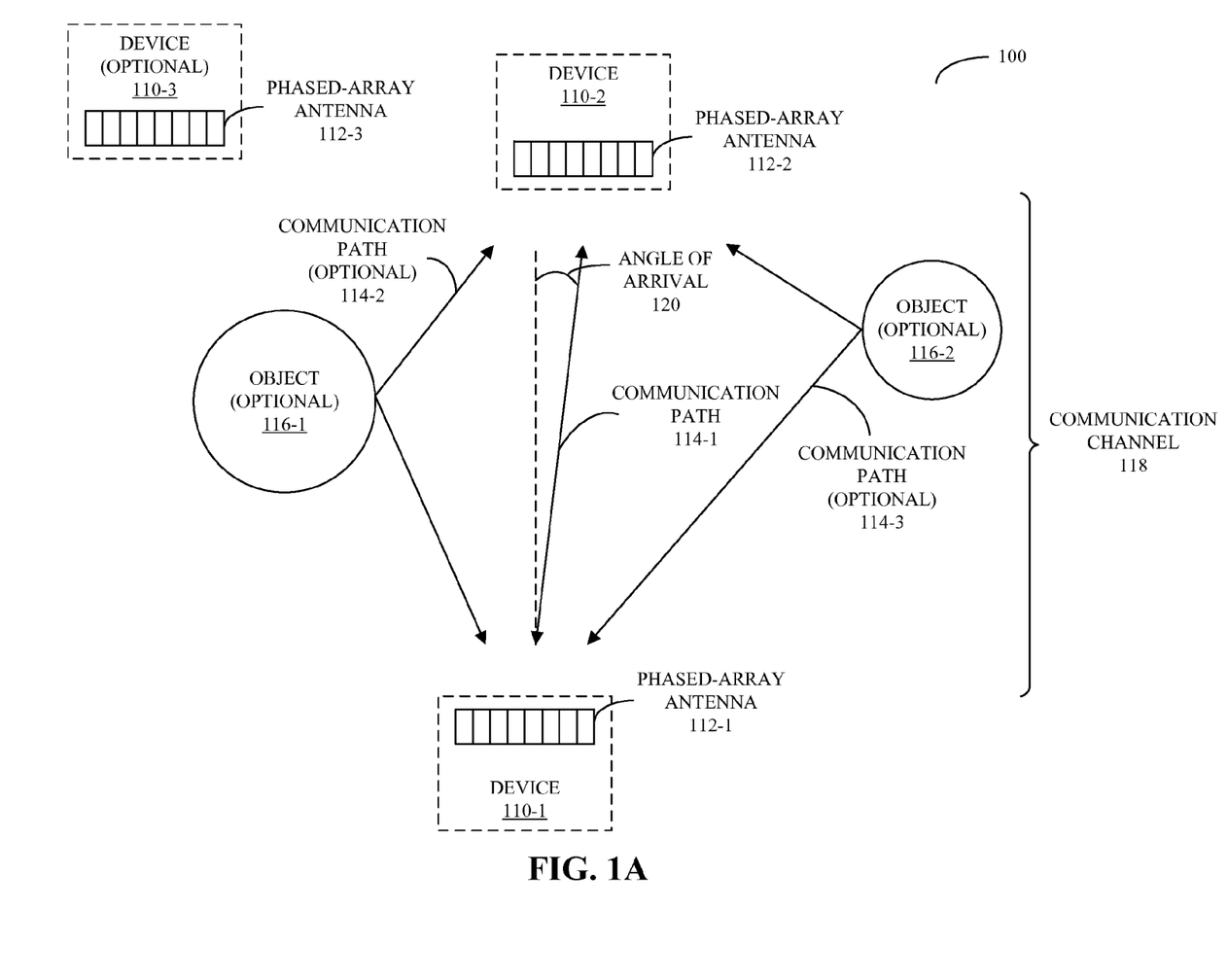
FIG. 1A is a block diagram illustrating an embodiment of a communication system.

FIG. 1A presents a block diagram illustrating a communication system 100. In this system, during an active mode, device 110-1 communicates information with device 110-2 via a communication channel 118 using wireless communication. Note that wireless communication includes transmitting and/or receiving electrical signals over a transmission medium other than a metallic conductor. Typically, the transmission medium is air. However, in some embodiments one or more of the devices 110 is also capable of transmitting electrical signals over transmission mediums made from one or more metallic conductors.

Communication between the devices 110 may be concurrent or serial. In the discussion that follows, communication between device 110-1 and device 110-2 is used as an example.

In some embodiments, communication between the devices 110 may be simultaneous (i.e., full duplex communication in which at least a pair of the devices 110 may transmit and receive information at the same time) or the communication direction may alternate (i.e., half-duplex communication in which, at a given time, one device transmits information and another device receives information).

Device 110-1 may include or may be coupled to antenna elements, such as phased-array antenna 112-1, to generate and/or receive signals, and device 110-2 may include or may be coupled to antenna elements, such as phased-array antenna 112-2, to generate and/or receive signals. In an exemplary embodiment, the phased-array antennas 112 include microstripline elements that are configured to output and/or receive signals in a 7 GHz frequency band centered on 60 GHz (or on a frequency between 50 and 90 GHz). These phased-array antennas may transmit and receive shaped beams. For example, the shaped beams may have a beam width of 15-25°.

Note that phased-array antennas 112 may facilitate communication of information between the devices 110 using signals modulated onto high carrier frequencies (such as 60 GHz), or in communication systems in which the transmission power is restricted (such as less than 10 mW) and the communication may be over distances on the order of 10 m (for example, the distances may be between 1 and 30 m). In particular, signals transmitted by one of the devices 110 may reflect off of optional objects 116 in proximity to the devices 110. Note that multi-path communication (and multi-path signals) may be associated with signals being scattered off of the optional objects 116.

Consequently, communication between the devices 110 may occur via direct (line-of-sight) or indirect (also referred to as multi-path or non-line-of-sight) communication paths 114. For example, the communication paths 114 may include direct communication path 114-1, as well as optional indirect communication paths 114-2 and/or 114-3. However, in some embodiments there may only be one communication path, such as communication path 114-1, between a given pair of devices, such as devices 110-1 and 110-2.

Determining a direction associated with a given communication path, such as the direct communication path 114-1, can be time consuming. Consequently, in some embodiments, while in a standby mode, device 110-2 may determine the direction based on an angle of arrival 120 of one or more wake-up signals that are transmitted by device 110-1 (which is described further below with reference to FIGS. 2-5). After at least one communication circuit in device 110-2 exits the standby mode (for example, it enters the active mode, i.e., the higher power-consumption mode), this communication circuit may use this direction when communicating information with device 110-1. For example, the communication circuit may adjust a transmission angle of shaped beams or an antenna pattern based on the direction. Note that in some embodiments device 110-2 may provide feedback information to device 110-1 about the direction associated with the given communication path, thereby allowing device 110-1 to acquire the given communication path more rapidly and to improve performance when communicating information with device 110-2.

Moreover, during the communication between the devices 110 in the active mode, a device, such as device 110-2, may provide feedback to another device, such as device 110-1, by characterizing the performance (which, in some cases, is also referred to as signal condition) associated with the given communication path, such as the communication path 114-1. For example, the characterization may include: determining or measuring: a signal strength (such as a signal amplitude or a signal intensity), a mean-square error (MSE) relative to a target (such as a threshold, a point in a constellation diagram, and/or a sequence of points in a constellation diagram), a signal-to-noise ratio (SNR), a bit-error rate (BER), a timing margin, and/or a voltage margin. In some embodiments, the characterization of the given communication path is performed: continuously, after a time interval has elapsed since a previous characterization of the given communication path, and/or as needed.

Note that the wake-up signal, as well as the communication of data, feedback information, and/or control information, may use in-band or out-of-band signaling (relative to the range of frequencies and/or bands of frequencies used in the given communication path). Moreover, in some embodiments communication of feedback information and/or control information between the devices 110 may occur via a separate link, such as a wireless link that has a lower data rate than the data rate of the given communication path and/or using a different carrier frequency or modulation technique than the one or more carrier frequencies of the signals on the given communication path. For example, this link may include a WLAN (such as IEEE 802.11 or Bluetooth®).

In some embodiments, the given communication path includes multiple sub-channels. Signals carried on these sub-channels may be time-multiplexed, frequency-multiplexed, and/or encoded. Thus, in some embodiments communication of information on the communication channel 118 uses: time-division multiple access (TDMA), frequency-division multiple access (FDMA), and/or code-division multiple access (CDMA).

In some embodiments, signals on the given communication path use discrete multi-tone communication (such as, for example, orthogonal frequency-division multiplexing or OFDM), which includes multiple sub-channels. A range of frequencies, a frequency band, or groups of frequency bands may be associated with a given sub-channel or frequency band. Frequency bands for adjacent sub-channels may partially or completely overlap, or may not overlap. For example, there may be partial overlap of neighboring frequency bands, which occurs in so-called approximate bit loading. Moreover, signals on adjacent sub-channels may be orthogonal.

In some embodiments a variety of techniques are used to restore or recover the given communication path if there is a loss of signal condition, such that the signal condition is sufficiently improved that communication via the given communication path can resume or can continue. For example, signals on the given communication path may be static or dynamically configured, such as by changing a number of sub-channels. Thus, one or more of the sub-channels in the given communication path may be adjusted when there is a loss or degradation of signal condition. For example, the number of sub-channels may be changed, or the data rate may be modified.

In some embodiments, an auto-negotiation technique is used between the devices 110 in an attempt to restore or recover the given communication path. During this auto-negotiation technique, device 110-2 may provide feedback to device 110-1 on the efficacy of a changes to one or more of the signals on the given communication path. Based on this feedback, device 110-1 may further modify the transmitted signals and may try to re-establish or maintain communication on the given communication path (the response of device 110-1 to this feedback is henceforth referred to as remedial action). Note that the remedial action may include: re-transmitting previous data; transmitting previous or new data (note that previous or new data is henceforth referred to as data) using a greater transmission power than the transmission power used in a previous transmission; reducing the data rate relative to the data rate used in a previous transmission; transmitting data with reduced intersymbol interference (for example, with blank intervals inserted before and/or after the data); transmitting data at a single clock edge (as opposed to double-data-rate transmission); transmitting data with at least a portion of the data including an error-correction code (ECC) or an error-detection code (EDC); transmitting data using a different encoding or modulation code than the encoding used in a previous transmission; transmitting data after a pre-determined idle time; transmitting data to a different receiver in device 110-2; and/or transmitting data to another device, such as optional device 110-3, which may attempt to forward the data to device 110-2. Consequently, communication in communication system 100 may involve point-to-point and/or point-to-multi-point communication.

Note that at least a portion of the ECC and/or the EDC data may be dynamically generated (i.e., in real time) and/or may be previously generated (i.e., pre-existing). In some embodiments, the ECC includes a Bose-Chaudhuri-Hochquenghem (BCH) code, which is a sub-class of cyclic codes. In exemplary embodiments, the ECC and/or the EDC data includes: a cyclic redundancy code (CRC), a parity code, a Hamming code, a Reed-Solomon code, and/or another error checking and correction code.

In some embodiments, communication between the devices 110 during the active mode occurs using multiple communication paths 114. For example, one or both of the devices 110 may select a primary communication path, such as communication path 114-1, based on the signal condition. If this primary communication path is subsequently degraded or disrupted, an alternate communication path may be used (i.e., the devices 110 may switch to the alternate communication path). This alternate communication path may be pre-determined by the devices 110 or may be identified by one or both of the devices 110 if the primary communication path is degraded or disrupted. Note that the use of an alternate communication path may supplement or may be used independently of the previously described remedial action.

Note that communication system 100 may include fewer components or additional components. Moreover, two or more components may be combined into a single component, and the position of one or more components may be changed. For example, one or more of the devices 110 may select the given communication path, at least in part, based on information associated with a positioning system (such as a local, differential, and/or global positioning system). This technique may allow the devices 110 to adapt when there is relative motion of the devices 110. Thus, device 110-1 may adapt one or more shaped beams based on information about the relative motion. Alternatively, the information associated with the positioning system may alert device 110-1 to the presence of another proximate device, such as the device 110-2.

Figure 1B:
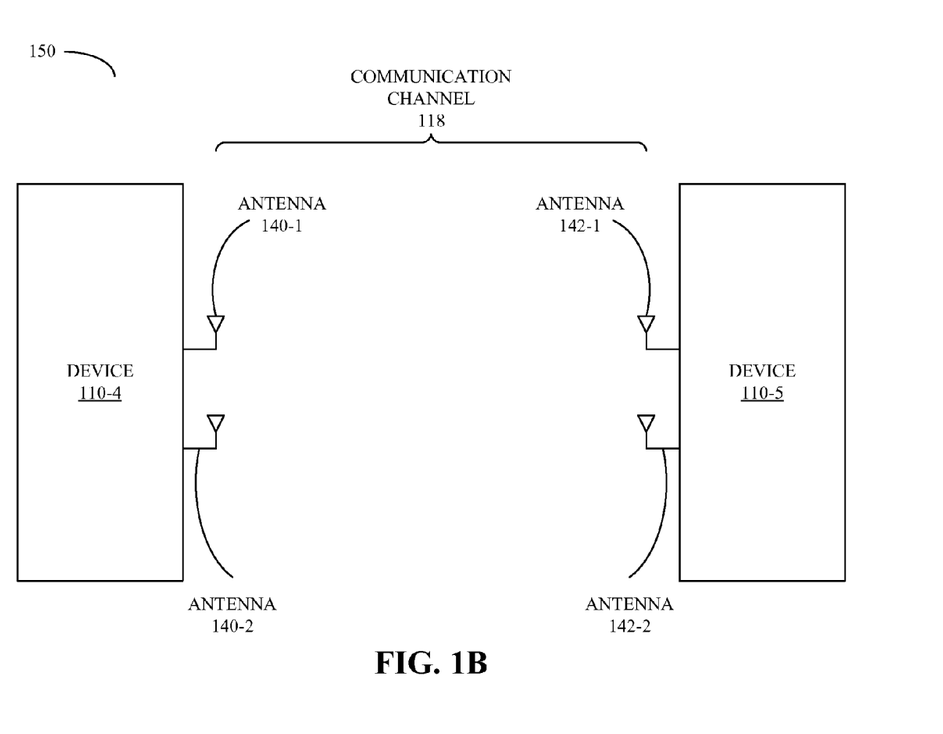
FIG. 1B is a block diagram illustrating an embodiment of a communication system.

In some embodiments, antenna elements are included in separate antennas (as opposed to in the phased-array antennas 112). This is shown in FIG. 1B, which presents a block diagram illustrating an embodiment of a communication system 150. In this system, device 110-4 may include or may be coupled to antennas, such as antennas 140 (each of which includes one or more antenna elements), to generate and/or receive signals. Moreover, device 110-5 may include or may be coupled to antennas, such as antennas 142 (each of which includes one or more antenna elements), to generate and/or receive signals.

As discussed previously, devices 110 in communication systems 100 (FIG. 1A) and 150, and in particular one or more communication circuits in these devices, may have multiple modes, including the standby mode and the active mode. During either or both of these modes, a given device, such as device 110-1 (FIG. 1A), may transmit one or more wake-up signals. These wake-up signals may include one or more narrow beams (which are associated with a range of directions or angles) or may be omni-directional. Moreover, the one or more wake-up signals may be transmitted using one or more antenna elements in one or more antennas 140 or 142, or in one of the phased-array antennas 112 (FIG. 1A). Note that the one or more wake-up signals can be associated with a broad range of frequencies (for example, 55-65 GHZ) or a narrow band of frequencies (for example, 59.9-60.1 GHz). In some embodiments, wake-up signals transmitted by different antenna elements: may have different polarizations; may be associated with different bands of frequencies; may be encoded differently from each other (for example, using TDMA, FDMA, and/or CDMA); may be transmitted using a spatial diversity technique; and/or may be orthogonal with respect to each other.

Moreover, a given device in the communication systems 100 (FIG. 1A) and 150 may monitor or scan for the presence of one of the one or more wake-up signals. In some embodiments, dedicated antenna elements in antennas are used. Each of these dedicated antenna elements may be associated with a given region in a space around the given device. For example, the space may be divided into four quadrants, and a dedicated, directional antenna element may be associated with a 30-60° range of directions. In addition to waking up at least one of the communication circuits in the given device, if one of the wake-up signals is received by one of these dedicated antenna elements (as determined based on a metric, such as a power level, of a given wake-up signal), the direction of the associated communication path can also be determined.

Alternatively, passive or active beam steering may be used to detect the presence of one or more wake-up signals. For example, a given phased-array antenna may monitor a given region in the space. However, in other embodiments the antenna pattern of the given phased-array antenna may scan across two or more regions for the one or more wake-up signals. In some embodiments, a uniform circular or spherical search pattern may be used. For example, at a first time, the given phased-array antenna may monitor for the one or more wake-up signals at $\theta=15°$ and ($\phi=0°$ (in spherical coordinates), and the results of the monitoring may be used to update a register A. Then, at a second time, the given phased-array antenna may monitor for the one or more wake-up signals at $\theta=30°$ and ($\phi=0°$ (in spherical coordinates), and the results of the monitoring may be used to update a register B, etc. In other embodiments, a systematic or directive search may be used, for example, by monitoring the space using 20° intervals. Moreover, the space may be scanned intelligently, for example, by using a binary search technique.

Note that the antennas and/or phased-array antennas that are used to receive the one or more wake-up signals may be configured to receive signals in a particular band(s) of frequencies and/or to receive signals having a particular polarization(s). In some embodiments, a given wake-up signal includes information in an associated fixed band of frequencies.

In some embodiments, in devices that include more than one instance of the communication circuits, one communication circuit may be in the active mode while another communication circuit may be in the standby mode. Consequently, the given device may communicate information while simultaneously scanning and/or monitoring for the presence of one or more wake-up signals (i.e., the given device may use full-duplex communication). To facilitate this, in some embodiments signals to and/or from a given communication circuit may be orthogonal in space, time, frequency, and/or coding with the signals to and/or from another communication circuit.

Figure 2A:
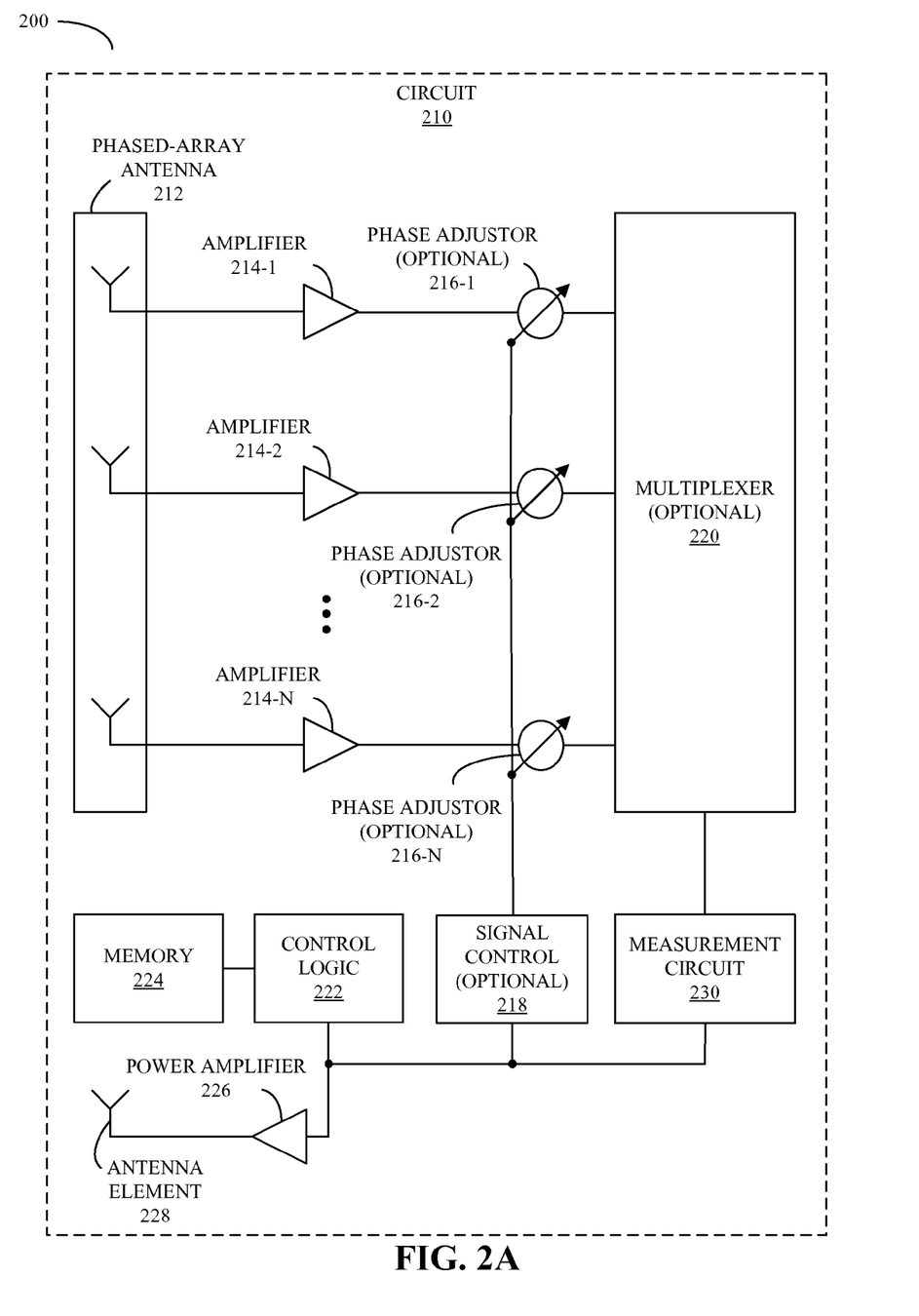
FIG. 2A is a block diagram illustrating an embodiment of a circuit.

We now describe circuits that may be used in one or more of the devices 110. FIG. 2A presents a block diagram illustrating an embodiment 200 of a circuit 210, which may be included in one or more of the devices 110 (FIGS. 1A and 1B). This circuit may include: the power-consumption-mode circuit, the measurement circuit, the control logic, and one or more communication circuits, which were described previously.

In this circuit, one or more wake-up signals transmitted by another device may be received using antenna elements in phased-array antenna 212. Note that the phased-array antenna 212 may be: external to the circuit 210, on-chip, on the package or chip carrier, and/or on another integrated circuit (for example, in a chip stack).

The one or more received electrical signals associated with the one or more wake-up signals may be amplified by amplifiers 214 (which may have a variable gain or a fixed gain) and relative phases of the signals from different antenna elements may be set using optional phase adjustors 216. For example, based on coefficients stored in memory 224 (such as in a look-up table), control logic 222 may instruct optional signal control 218 to adjust relative phases of these electrical signals using the optional phase adjustors 216. In this way, the receive direction of the antenna pattern of the phased-array antenna 212 may be adjusted. However, in other embodiments, such as embodiments with dedicated receive antennas, the relative phases of the optional phase adjustors 216 may be pre-defined, i.e., the receive direction of the antenna pattern of the phased-array antenna 212 may be fixed. Using either of these techniques, the one or more electrical signals associated with one or more wake-up signals, which include directional information corresponding to a region in the space, may be received.

Next, measurement circuit 230 determines whether a metric (such as a power level) of the one or more received electrical signals exceeds a corresponding threshold. In some embodiments, optional multiplexer 220 selectively couples one or more received electrical signals associated with one or more antenna elements to the measurement circuit 230. For example, time multiplexing may be used. Alternatively, the different antenna elements may be associated with different bands of frequencies (i.e., frequency multiplexing may be used) and/or different encoding. Using one or more of these techniques, the one or more received electrical signals may be associated with a particular direction (or the direction may be known from the phase settings of the optional phase adjustors 216, when active or passive beam steering is used). As noted previously, the direction of a given wake-up signal may be used when one or more communication circuits switch to the active mode. For example, the direction may be stored in memory 224.

Note that the presence of the one or more wake-up signals and/or the associated direction(s) may be determined, for example: once, after a time interval, and/or as needed (such as when there is a degradation in the signal condition associated with the given communication path that cannot be suitably restored using one or more remedial actions).

If the metric of at least one of the electrical signals exceeds the corresponding threshold, control logic 222 may instruct a portion of the circuit 210, such as power amplifier 226 (which is coupled to antenna element 228), to exit the standby mode. Note that the power amplifier 226 and antenna element 228 may be used to communicate information with another device that transmitted the received one or more electrical signals associated with the one or more wake-up signals.

Figure 2B:
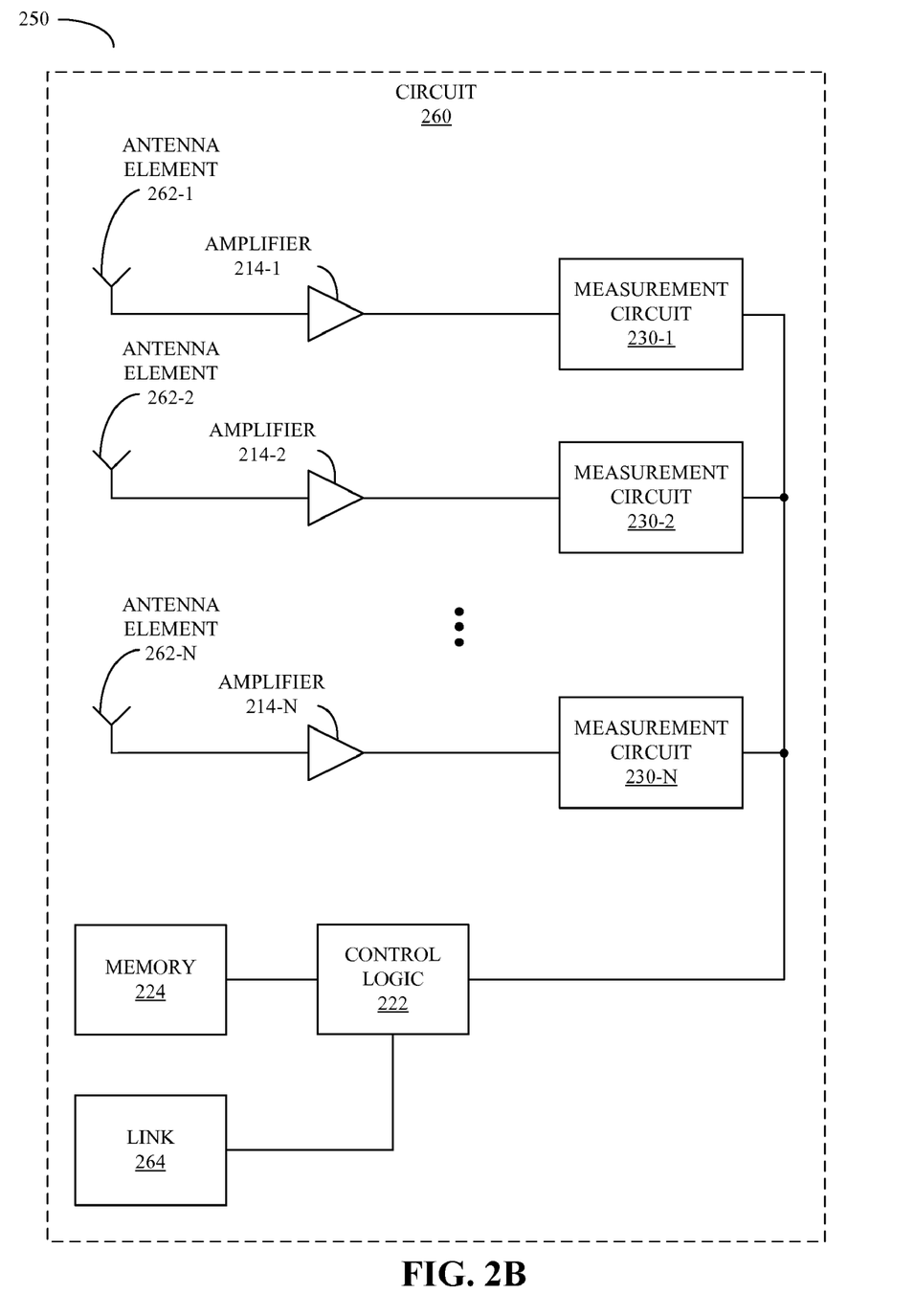
FIG. 2B is a block diagram illustrating an embodiment of a circuit.

As shown in FIG. 2B, which presents a block diagram illustrating an embodiment 250 of a circuit 260 (which may be included in one or more of devices 110 in FIGS. 1A and 1B), in some embodiments multiple measurement circuits 230 are coupled to dedicated antenna elements 262 (which each may have an associated direction, band of frequencies, and/or polarization). Note that the antenna elements 262 may be: external to the circuit 260, on-chip, on the package or chip carrier, and/or on another integrated circuit (for example, in a chip stack). Moreover, in these embodiments control logic 222 instructs a link 264 (which may include the power amplifier 226 and antenna element 228 in FIG. 2A) if one or more metrics of the one or more received electrical signals associated with one or more wake-up signals exceed their corresponding thresholds.

In general, the one or more electrical signals associated with the one or more wake-up signals may be received during the standby mode without using a synchronous detection technique. For example, the one or more wake-up signals may be received using a non-coherent detection technique, such as a power measurement.

Moreover, measurement of the metric (or more generally, the metrics) associated with the one or more received electrical signals may be performed at a carrier frequency of the one or more wake-up signals (i.e., without demodulating the received electrical signals). Consequently, detecting the presence of one or more wake-up signals may occur prior to synchronization of the devices 110 (FIGS. 1A and 1B).

However, in other embodiments the one or more wake-up signals may be received during the standby mode using a synchronous detection technique, which may receive the one or more electrical signals based on one or both edges of a clock signal. Consequently, in some embodiments the circuits 210 (FIG. 2A) and 260 may perform: baseband demodulation (for example, using a Fast Fourier Transform or FFT), equalization (such as linear or non-linear equalization), data-symbol detection (using slicers and/or sequence detection), and baseband decoding. For example, the baseband decoding may include symbol-to-bit encoding that is the opposite or the inverse of a bit-to-symbol encoding performed prior to transmitting the one or more wake-up signals. This coding should be understood to include modulation coding and/or spread-spectrum encoding, for example: coding based on binary pseudorandom sequences (such as maximal length sequences or m-sequences); Gold codes; and/or Kasami sequences.

In some embodiments, circuits 210 (FIG. 2A) and 260 implement error detection and/or correction. For example, errors may be detected in either the standby or active modes by performing a multi-bit XOR operation in conjunction with one or more parity bits in the received electrical signals.

Before, during or after the amplification by the amplifiers 214, the one or more received electrical signals may be converted to digital electrical signals using an analog-to-digital converter (ADC). Moreover, in some embodiments, before, during or after the amplification by the amplifiers 214, the one or more received electrical signals may be radio frequency (RF) down-converted to baseband from one or more appropriate frequency bands using one or more carrier frequencies $f_i$ associated with one or more wake-up signals (such as one or more sub-channels). For example, the down-conversion may use frequency-conversion elements, such as one or more heterodyne mixers or modulators. Moreover, in some embodiments the amplifier 214 may adjust the gain in the circuits 210 (FIG. 2A) and 260, for example, based on an automatic gain control (AGC) loop.

Note that circuits 210 (FIG. 2A) and 260 may include fewer components or additional components. For example, there may be additional antennas (or antenna elements) and/or the signal lines that couple components to each other may indicate multiple signal lines (or a bus). In some embodiments, circuits 210 (FIG. 2A) and 260 include pre-emphasis and/or other forms of equalization that compensate, during the active mode, for losses and/or dispersion associated with the given communication channel. Note that pre-emphasis and/or equalization may be implemented using feed-forward filters and/or decision-feedback-equalization circuits.

Moreover, while not explicitly shown in circuits 210 (FIG. 2 A) and 260, these circuits may include memory buffers for one or more electrical signals. In addition, clocking circuits are not explicitly illustrated in circuits 210 (FIG. 2A) and 260. Nonetheless, one or more electrical signals may be transmitted and/or received based on either or both edges in one or more clock signals. Note that in some embodiments transmitting and receiving may be synchronous and/or asynchronous. However, as noted above, in some embodiments one or more wake-up signals are received without using a synchronous detection technique.

Components and/or functionality illustrated circuits 210 (FIG. 2A) and 260 may be implemented using analog circuits and/or digital circuits. Furthermore, components and/or functionality in these circuits may be implemented using hardware and/or software. In some embodiments, control logic 222 operates on physical-layer structures (such as an RF front-end) in these circuits without using information from baseband-processing components.

Note that two or more components in circuits 210 (FIG. 2A) and 260 may be combined into a single component and/or the position of one or more components may be changed. In some embodiments, circuits 210 (FIG. 2A) and 260 are included in one or more integrated circuits on one or more semiconductor die.

Figure 3:
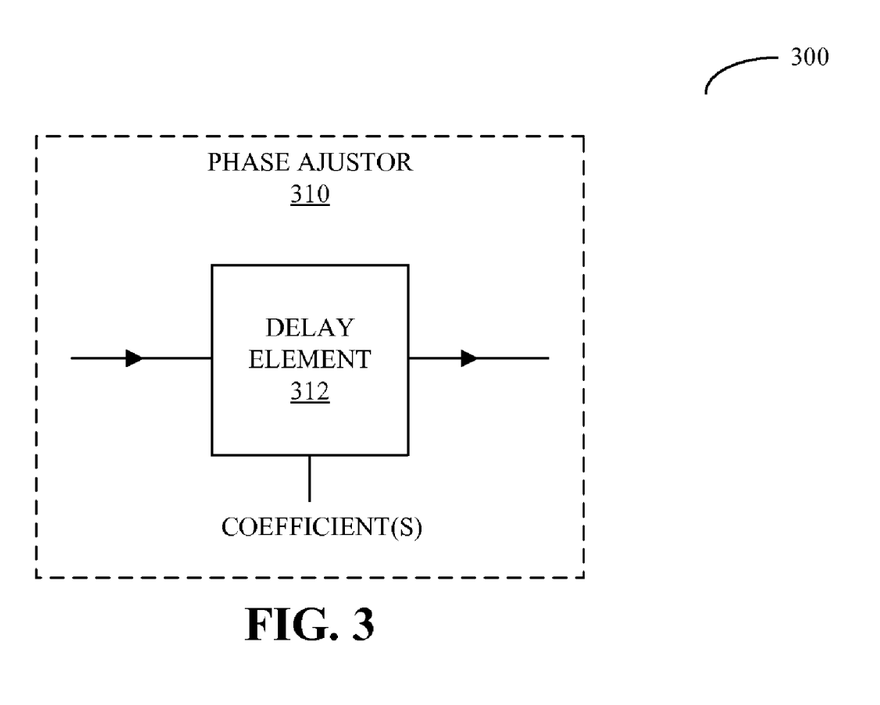
FIG. 3 is a block diagram illustrating an embodiment of a phase adjustor.

As noted previously, the one or more electrical signals associated with the one or more wake-up signals may be received using a non-synchronous detection technique. The optional phase adjustors 216 (FIG. 2A) may be implemented using simple delay elements, such as, for example, a varactor, or using the delay associated with capacitor loading. This allows low-cost communication circuits that use low-power beam steering to detect the presence of the one or more wake-up signals. FIG. 3 presents a block diagram illustrating an embodiment 300 of a phase adjustor 310. In this phase adjustor, an adjustable phase of delay element 312 may be set based on coefficients that are provided by optional signal control 218 (FIG. 2A).

Figure 4:
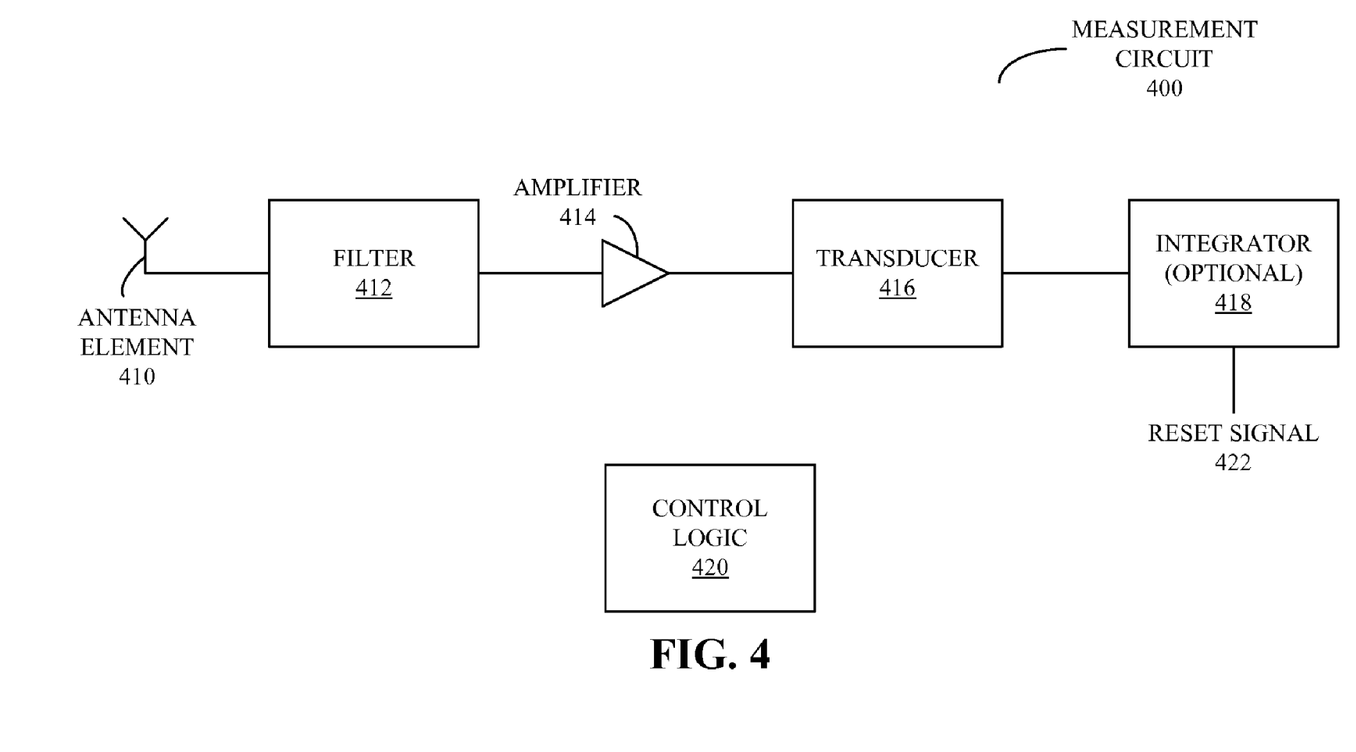
FIG. 4 is a block diagram illustrating an embodiment of a measurement circuit.

We now describe some embodiments of a measurement circuit. FIG. 4 presents a block diagram illustrating an embodiment of a measurement circuit 400 (which may be included in the devices 110 in FIGS. 1A and 1B, in the circuit 210 in FIG. 2A, or in the circuit 260 in FIG. 2B). In this measurement circuit, one or more electrical signals associated with one or more wake-up signals are received by antenna element 410 (which may be in a phased-array antenna or an antenna). These electrical signals may be filtered using filter 412 and amplified by an amplifier, such as, for example, low-noise amplifier 414. In an exemplary embodiment, filter 412 is a bandpass filter with a central frequency of 60 GHz and a passband of 2 GHz.

Next, the one or more electrical signals are coupled to a transducer 416, and an output from the transducer is coupled to an optional integrator 418 to improve a sensitivity of the measurement of the metric. In an exemplary embodiment, the transducer 416 is a diode that converts current to voltage. Consequently, the output from the diode corresponds to the power level of the one or more electrical signals.

The output from the integrator may be compared to a threshold (such as a voltage), for example, using a comparator (not shown). Moreover, logical post processing may be performed on the output from the optional integrator 418, for example, using control logic 420. Results from the comparator and/or the logical post processing may be used to update a value stored in a register.

Note that the threshold may be software defined. For example, a user or control logic 420 may specify a low threshold that is more likely to wake a communication circuit sooner when the one or more wake-up signals are present, at the expense of wasting energy because of an increase in the number of false positives. Alternatively, a higher threshold may be used. This offers improved energy-consumption efficiency at the cost of a delay in switching to the active mode (in general, with a higher threshold the communication circuit will need to be closer to the source of the one or more wake-up signals before the metric exceeds the threshold). Consequently, in some embodiments, thresholds of one or more measurement circuits are defined based on a power-usage criterion.

In some embodiments, decision making, such as whether or not to exit the standby mode, involves a time-conditioned response. For example, control logic 420 may determine whether to instruct the communication circuit to exit the reduced power-consumption mode based on: the number of times the metric of the one or more electrical signals exceeds the threshold during a time interval; a power-usage history of at least the communication circuit in a receiver or a transceiver (such as those in the circuit 210 in FIG. 2A); and/or an elapsed time since a previous exit from the standby mode.

Note that the output from the optional integrator 418 may be reset using reset signal 422 after a time interval (such as an elapsed time since the communication circuit exited the standby mode) and/or based on a power-usage history of the communication circuit.

In some embodiments, measurement circuit 400 includes fewer components or additional components. Moreover, two or more components may be combined into a single component, and the position of one or more components may be changed.

Figure 5:
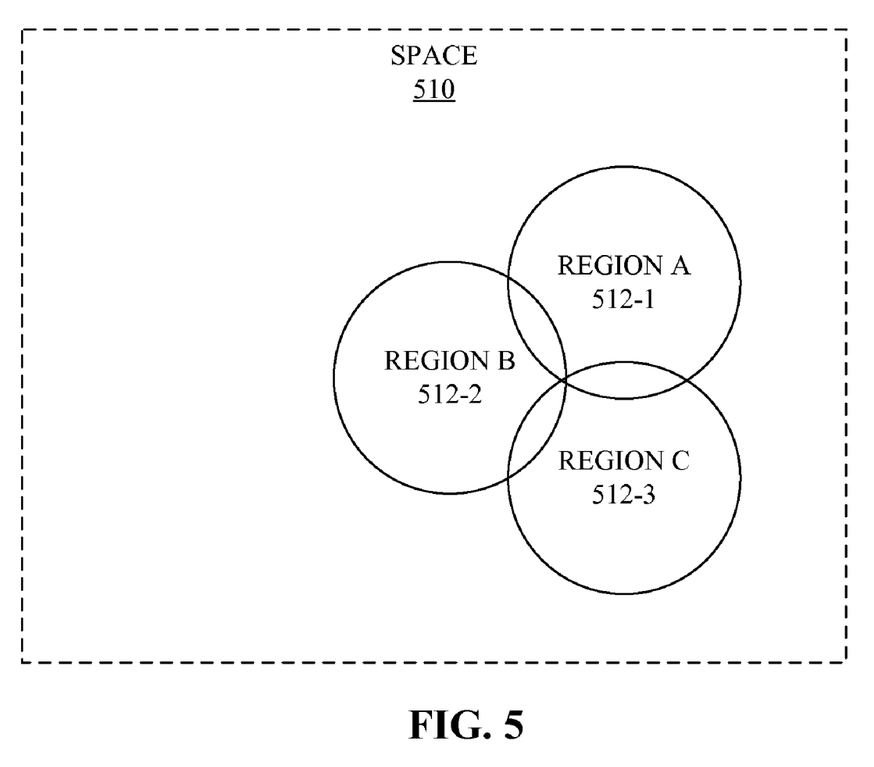
FIG. 5 is a block diagram illustrating a space.

While FIG. 4 illustrates decision making based on one threshold, in other embodiments whether or not to exit the standby mode is based on multiple wake-up signals and associated thresholds. This is shown in FIG. 5, which presents a block diagram illustrating a space 510. This space may include multiple regions 512. Wake-up signals associated with each region may be received (for example, using dedicated antennas and/or a phased-array antenna that scans the space 510) and metrics for each of the corresponding electrical signals may be compared to an associated threshold. A decision as to whether or not to exit the standby mode may be based on the metrics for one or more of these electrical signals that exceed their associated thresholds.

Note that in some embodiments, when metrics for electrical signals associated with two or more regions 512 exceed their associated thresholds, interpolation or another processing technique may be used to determine the direction of the given communication path. Moreover, as noted previously, in some embodiments a device may include multiple communication circuits, where one communication circuit may be in the active mode based on detection of a wake-up signal in a first region (such as region 512-1), while another communication may be in the standby mode and may be scanning for a wake-up signal in a second region (such as region 512-2).

Figure 6:
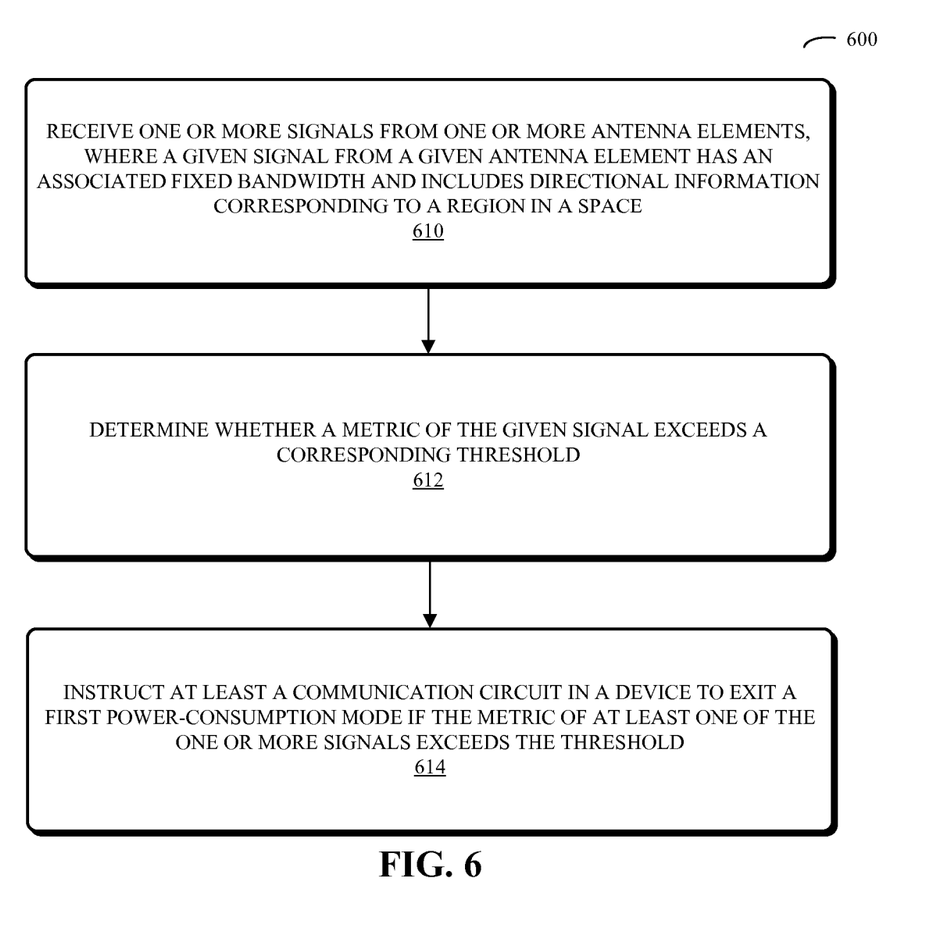
FIG. 6 is a flow chart illustrating an embodiment of a process for selecting a mode.

We now describe embodiments of a process for selecting a mode. FIG. 6 presents a flow chart illustrating an embodiment of a process 600 for selecting a mode, which may be performed by the device. During operation, the device receives one or more signals from one or more antenna elements (610), wherein a given signal from a given antenna element has an associated fixed bandwidth and includes directional information corresponding to a region in a space. Next, the device determines whether a metric of the given signal exceeds a corresponding threshold (612). Then, the device instructs at least a communication circuit in the device to exit a first power-consumption mode if the metric of at least one of the one or more signals exceeds the corresponding threshold (614).

Note that in some embodiments there may be additional or fewer operations in process 600. Moreover, the order of the operations may be changed, and two or more operations may be combined into a single operation.

Devices and circuits described herein may be implemented using computer-aided design tools available in the art, and embodied by computer-readable files containing software descriptions of such circuits. These software descriptions may be: at behavioral, register transfer, logic component, transistor and layout geometry-level descriptions. Moreover, the software descriptions may be stored on storage media or communicated by carrier waves.

Data formats in which such descriptions may be implemented include, but are not limited to: formats supporting behavioral languages like C, formats supporting register transfer level (RTL) languages like Verilog and VHDL, formats supporting geometry description languages (such as GDSII, GDSIII, GDSIV, CIF, and MEBES), and other suitable formats and languages. Moreover, data transfers of such files on machine-readable media or carrier waves may be done electronically over diverse media on the Internet or, for example, via email. Note that physical files may be implemented on machine-readable media such as: 4 mm magnetic tape, 8 mm magnetic tape, 3½ inch floppy media, CDs, DVDs, and so on.

Figure 7:
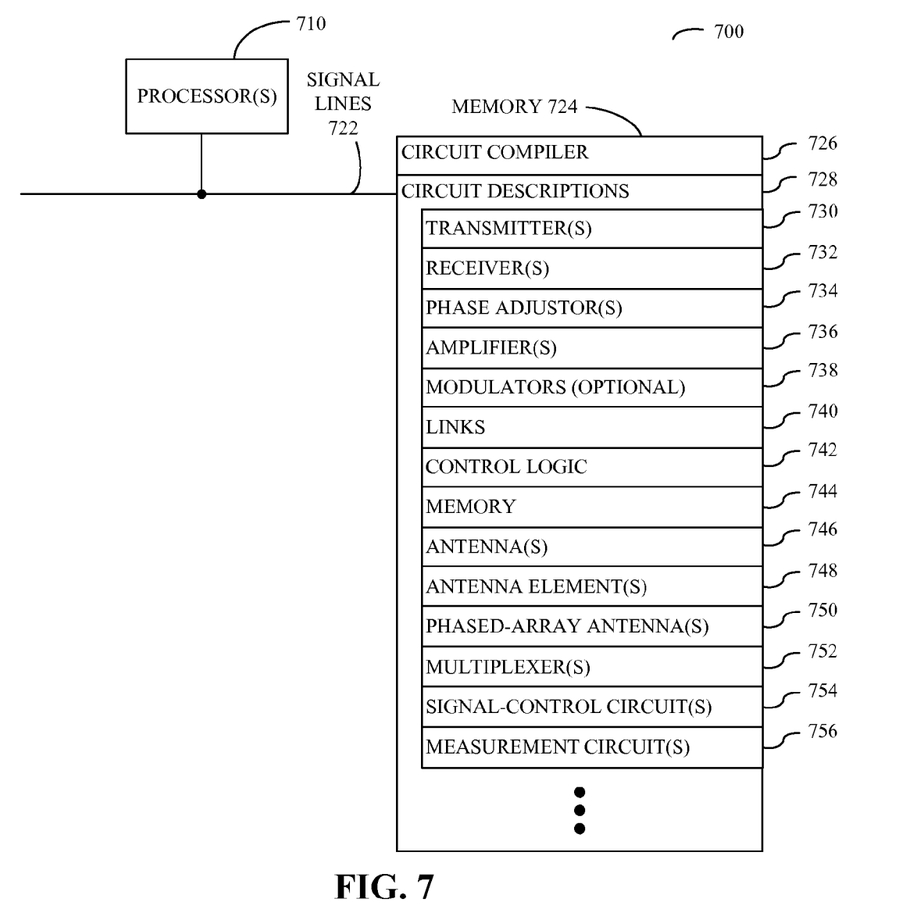
FIG. 7 is a block diagram illustrating an embodiment of a system.

FIG. 7 presents a block diagram illustrating an embodiment of a system 700 that stores such computer-readable files. This system may include at least one data processor or central processing unit (CPU) 710, memory 724 and one or more signal lines or communication busses 722 for coupling these components to one another. Memory 724 may include high-speed random access memory and/or non-volatile memory, such as: ROM, RAM, EPROM, EEPROM, Flash, one or more smart cards, one or more magnetic disc storage devices, and/or one or more optical storage devices.

Memory 724 may store a circuit compiler 726 and circuit descriptions 728. Circuit descriptions 728 may include descriptions of the circuits, or a subset of the circuits discussed above with respect to FIGS. 1-5. In particular, circuit descriptions 728 may include circuit descriptions of: one or more communication circuits (including one or more transmitters 730 and/or one or more receivers 732), one or more phase adjustors 734, one or more amplifiers 736, one or more optional modulators 738, one or more links 740, control logic 742 (or a set of instructions), one or more memory 744, one or more antennas 746, one or more antenna elements 748, one or more phased-array antennas 750, one or more multiplexers 752, one or more signal-control circuits 754, and/or one or more measurement circuits 756.

In some embodiments, system 700 includes fewer or additional components. Moreover, two or more components can be combined into a single component, and/or a position of one or more components may be changed.

The foregoing descriptions of embodiments have been presented for purposes of illustration and description only. They are not intended to be exhaustive or to limit the present description to the forms disclosed. Accordingly, many modifications and variations will be apparent to practitioners skilled in the art. Additionally, the above disclosure is not intended to limit the present description. The scope of the present description is defined by the appended claims.

What is claimed is:

1. An integrated circuit, comprising:
a receiver, wherein the receiver includes:
at least one input node to receive one or more signals from one or more antenna elements, wherein a given signal from a given antenna element has an associated fixed bandwidth and includes directional information corresponding to a region in a space;
a measurement circuit, coupled to at least the one input node, to determine whether a metric of the given signal exceeds a corresponding threshold; and
control logic, coupled to the measurement circuit, to instruct a communication circuit in the integrated circuit to exit a first power-consumption mode if the metric of at least one of the signals exceeds the corresponding threshold.

2. The integrated circuit of claim 1, further comprising antennas that include the antenna elements.

3. The integrated circuit of claim 1, further comprising a phase-arrayed antenna including the antenna elements.

4. The integrated circuit of claim 1, wherein the signals from different antenna elements are associated with different bandwidths, thereby facilitating determination of a direction associated with the at least one signal.

5. The integrated circuit of claim 4, wherein the direction is to be used to communicate information with another integrated circuit when the communication circuit exits the first power-consumption mode.

6. The integrated circuit of claim 1, wherein the signals from different antenna elements are to be selectively coupled to the measurement circuit using time multiplexing, thereby facilitating determination of a direction associated with the one signal.

7. The integrated circuit of claim 6, wherein the direction is to be used to communicate information with another integrated circuit when the communication circuit exits the first power-consumption mode.

8. The integrated circuit of claim 1, wherein the region in the space is to be selected using beam steering, thereby facilitating determination of a direction associated with the at least one signal.

9. The integrated circuit of claim 8, wherein the direction is to be used to communicate information with another integrated circuit when the communication circuit exits the first power-consumption mode.

10. The integrated circuit of claim 1, wherein the control logic determines whether to instruct the communication circuit to exit the first power-consumption mode based whether the metrics of two or more signals exceed their corresponding thresholds; and
wherein each of the signals corresponds, at least in part, to a different region of the space.

11. The integrated circuit of claim 1, wherein whether the metric of the given signal exceeds the corresponding threshold is determined without using a synchronous detection technique.

12. The integrated circuit of claim 1, wherein the control logic determines whether to instruct the communication circuit to exit the first power-consumption mode based on the number of times the metric of at least the one signal exceeds the threshold during a time interval.

13. The integrated circuit of claim 1, wherein the control logic determines whether to instruct the communication circuit to exit the first power-consumption mode based on a power-usage history of at least the communication circuit in the integrated circuit.

14. The integrated circuit of claim 1, wherein one or more thresholds are defined based on a power-usage criterion.

15. The integrated circuit of claim 14, wherein the power-usage criterion is user selectable.

16. The integrated circuit of claim 1, wherein the control logic determines whether to instruct the communication circuit to exit the first power-consumption mode based on an elapsed time since a previous exit from the first power-consumption mode.

17. The integrated circuit of claim 1, wherein the integrated circuit includes multiple communication circuits and is to use full-duplex communication; and
   wherein a given communication circuit is to remain in the first power-consumption mode until the metric of at least the one signal exceeds the threshold even if another communication circuit has already exited the first power-consumption mode.

18. The integrated circuit of claim 17, wherein the signals for the given communication circuit are orthogonal in space, time, frequency, and/or coding with the signals for the other communication circuit.

19. The integrated circuit of claim 1, wherein an output from the measurement circuit is to be reset after a time interval.

20. The integrated circuit of claim 1, wherein an output from the measurement circuit is to be reset based on a power-usage history of at least the communication circuit in the integrated circuit.

21. A circuit, comprising:
   a receiver circuit, wherein the receiver circuit includes:
      at least one input node to receive one or more signals from one or more antenna elements, wherein a given signal from a given antenna element has an associated fixed bandwidth and includes directional information corresponding to a region in a space;
      a measurement circuit, coupled to at least the one input node, to determine whether a metric of the given signal exceeds a corresponding threshold; and
      control logic, coupled to the measurement circuit, to instruct a communication circuit in the circuit to exit a first power-consumption mode if the metric of at least one of the signals exceeds the corresponding threshold.

22. A system, comprising:
   a receiver, wherein the receiver includes:
      at least one input node to receive one or more signals from one or more antenna elements, wherein a given signal from a given antenna element has an associated fixed bandwidth and includes directional information corresponding to a region in a space;
      a measurement circuit, coupled to at least the one input node, to determine whether a metric of the given signal exceeds a corresponding threshold; and
      control logic, coupled to the measurement circuit, to instruct a communication circuit in the system to exit a first power-consumption mode if the metric of at least one of the signals exceeds the corresponding threshold.

23. A circuit, comprising:
   a receiver, wherein the receiver includes:
      at least one input node to receive one or more signals from one or more antenna elements, wherein a given signal from a given antenna element has an associated fixed bandwidth and includes directional information corresponding to a region in a space;
      means for determining whether a metric of the given signal exceeds a corresponding threshold, wherein the means is coupled to at least the one input node; and
      control logic, coupled to the means, to instruct a communication circuit in the circuit to exit a first power-consumption mode if the metric of at least one of the signals exceeds the corresponding threshold.

24. A computer-readable medium containing data representing a circuit that includes:
   a receiver circuit, wherein the receiver circuit includes:
      at least one input node to receive one or more signals from one or more antenna elements, wherein a given signal from a given antenna element has an associated fixed bandwidth and includes directional information corresponding to a region in a space;
      a measurement circuit, coupled to at least the one input node, to determine whether a metric of the given signal exceeds a corresponding threshold; and
      control logic, coupled to the measurement circuit, to instruct a communication circuit in the circuit to exit a first power-consumption mode if the metric of at least one of the signals exceeds the corresponding threshold.

25. A method for selecting a mode, comprising:
   receiving one or more signals from one or more antenna elements, wherein a given signal from a given antenna element has an associated fixed bandwidth and includes directional information corresponding to a region in a space;
   determining whether a metric of the given signal exceeds a corresponding threshold; and
   instructing at least a communication circuit to exit a first power-consumption mode if the metric of at least one of the signals exceeds the corresponding threshold.

* * * * *